United States Patent
Kaiser (10) Patent No.: US 7,165,066 B2
(45) Date of Patent: Jan. 16, 2007

(54) SYSTEMS AND METHODS FOR ASSOCIATING SYSTEM ENTITIES WITH DESCRIPTIONS

(75) Inventor: Matthias Kaiser, Mountain View, CA (US)

(73) Assignee: SAP AG, Walldorf (DE)

( * ) Notice: Subject to any disclaimer, the term of this patent is extended or adjusted under 35 U.S.C. 154(b) by 471 days.

(21) Appl. No.: 10/326,390

(22) Filed: Dec. 23, 2002

(65) Prior Publication Data

US 2004/0122817 A1 Jun. 24, 2004

(51) Int. Cl.
*G06F 17/30* (2006.01)
*G06F 15/16* (2006.01)

(52) U.S. Cl. ............................ 707/5; 707/4; 709/203
(58) Field of Classification Search ................ None
See application file for complete search history.

(56) References Cited

U.S. PATENT DOCUMENTS

| | | | |
|---|---|---|---|
| 5,325,298 A | 6/1994 | Gallant | 704/9 |
| 5,675,819 A | 10/1997 | Schuetze | 704/10 |
| 6,185,558 B1 | 2/2001 | Bowman et al. | |
| 6,341,282 B1 | 1/2002 | Sharpe et al. | 707/3 |
| 6,405,123 B1 * | 6/2002 | Rennard et al. | 701/200 |
| 2003/0172075 A1 * | 9/2003 | Reisman | 707/10 |

FOREIGN PATENT DOCUMENTS

| | | |
|---|---|---|
| EP | 1 098 258 A1 | 5/2001 |
| WO | WO 01/33414 A2 | 5/2001 |
| WO | WO 02/19167 A2 | 3/2002 |

OTHER PUBLICATIONS

International Search Report.

* cited by examiner

*Primary Examiner*—Jeffrey Gaffin
*Assistant Examiner*—Hassah Mahmoudi
(74) *Attorney, Agent, or Firm*—Finnegan, Henderson, Farabow, Garrett & Dunner, L.L.P.

(57) ABSTRACT

The present invention provides methods and systems that provide users with the ability to navigate through information systems using natural language descriptions. In accordance with at least one embodiment, the navigation tool can be personalized and can adaptively and dynamically associate descriptions provided by users with various entities, thereby acquiring utility from increased use. In another embodiment, the navigation tool enables associations to be modified using feedback obtained from a user and utilizes such modifications to provide users with useful results.

24 Claims, 8 Drawing Sheets

SYSTEMS AND METHODS FOR ASSOCIATING SYSTEM ENTITIES WITH DESCRIPTIONS

BACKGROUND OF THE INVENTION

1. Field of the Invention

The present invention generally relates to information systems, and more particularly, to systems and methods for associating entities related to information systems with descriptions. In one example, computer application entities may be associated with natural language descriptions and may be provided to a user in response to the user inputting such descriptions through an application interface.

2. Description of the Related Art

With the advent of the Internet and other information systems, a profusion of search mechanisms, routing systems, menu-based interfaces, and other navigation tools have emerged. Such tools are often employed to assist users in searching, utilizing, maneuvering through, and gaining access to information related to a particular system.

Search engines are commonly used with Internet and other computer applications. Typically, search engines index the content of a given system, and provide users with results by comparing queries with entries in the index. Conventional searching systems, however, cannot be tailored to a plurality of users having distinctive vernaculars and/or language preferences. Further, typical search engines are unable to dynamically learn by user feedback. That is, the utility of conventional searching tools does not improve with increased use. Moreover, conventional searching mechanisms are limited by a user's ability to articulate the query. For example, the user will not obtain useful results if the searching system fails to recognize the inputted query or the inputted query does not properly relate to the information sought.

Certain Internet search engines allow users to enter natural language queries, such as "How much did the Dow Jones industrial average fall today?" However, these systems are not easily personalized for different users. In addition, these systems often lack the ability to dynamically update and revise associations between natural language descriptions and system entities based on user feedback. Moreover, like other conventional search engines, these systems are typically limited in their ability to retrieve non-text items using natural language queries.

Typical user interfaces, employed by computer applications and automated systems, utilize directories and/or trees. Often, hierarchically-structured subject directories are used to organize information by topics and subtopics. Tree structures locate information by making successive choices at various decision points, or nodes. Automated call routing systems, for example, often employ decision trees and hierarchical menus for routing users to various destinations. Such systems, however, are inefficient and time-consuming: A user must perform several steps and/or selections before reaching a destination, which is often times not the destination desired by the user. Further, when an undesired destination is reached, the user must start the entire process over in order to reach the target destination.

Accordingly, it may be beneficial to provide users of information systems with the ability to navigate through such systems using natural language descriptions. It may be advantageous to provide a navigation tool which can be personalized, and which can adaptively and dynamically associate descriptions provided by users with various entities, thereby acquiring utility from increased use. Moreover, it may be beneficial to enable associations to be modified using feedback obtained from a user and utilize such modifications to provide users with useful results.

SUMMARY

The instant invention is directed to methods and systems that may obviate one or more of the above and/or other problems. Systems and methods consistent with principles of the instant invention may establish one or more associations between entities related to an information system and descriptions, such as natural language expressions provided by system users. Accordingly, the instant invention may enable users to effectively and expeditiously navigate through a given system. Further, the instant invention may obtain and exploit feedback from users in order to dynamically acquire, interpret, and modify associations between descriptions and system entities.

Although, in its broadest sense, the instant invention is not limited or inherently related to information systems, such systems are used herein to convey aspects of the invention.

One aspect of the instant invention involves associating entities related to an information system with descriptions. In one implementation, an information system could be a computer application running on a client and/or a server. In such an implementation, system entities may include, for example, menu items, icons, images, hyperlinks, system actions, and action symbols. Consistent with principles of the instant invention, a communications gateway may be established with the information system through which descriptions and associated system entities are routed. For example, a user of a computer application could input a description, which may be routed through an application interface to a navigation module, which identifies via an association lexicon a system entity having one or more associations with the description. Descriptions may include one or more alphanumeric characters, audio signals, and/or video signals provided by a user to describe a given entity. The identified system entities may then be prioritized and provided to the user without the user interacting with the system.

One aspect of the instant invention involves updating the associations by obtaining and exploiting feedback from a user after providing the system entities to the user. Updating may entail dynamically acquiring new descriptions and associating such descriptions with system entities. In addition, updating may involve strengthening and/or weakening associations between natural language descriptions and entities by, for example, incrementing and/or decrementing bias weights.

Updating may also entail removing or weakening associations that have not been used after a specific period of time. Consistent with principles of the instant invention, bias weights may be used to determine a particular system entity's relevance to a given user-provided description. In the above-mentioned fashion, the instant invention may evolve over time via feedback.

One aspect of the instant invention involves enabling a particular user, workgroup, or environment to use their own personalized descriptions to retrieve system entities. That is, a specific system entity may be associated with several user-specific descriptions. As a result, a plurality of users may be able to retrieve system entities using their own distinctive personalized descriptions. Accordingly, there may be methods provided for identifying a particular user and identifying preferences and/or peculiarities corresponding to said user.

Additional aspects related to the invention will be set forth in part in the description which follows, and in part will be obvious from the description, or may be learned by practice of the invention. Aspects of the invention may be realized and attained by means of the elements and combinations particularly pointed out in the appended claims.

It is to be understood that both the foregoing and the following descriptions are exemplary and explanatory only and are not intended to limit the claimed invention in any manner whatsoever.

BRIEF DESCRIPTION OF THE DRAWINGS

The accompanying drawings, which are incorporated in and constitute a part of this specification exemplify certain aspects of the present invention and, together with the description, serve to explain some of the principles associated with the invention.

DETAILED DESCRIPTION

In the following detailed description reference will be made to the accompanying drawings, in which like numerals represent like elements throughout the figures. The accompanying figures illustrate exemplary embodiments of the present invention, which are described in sufficient detail to enable those skilled in may be utilized and that structural and method changes may be made without departing from the scope of present invention. The following discussion is, therefore, not to be construed in a limiting sense.

Figure 1:
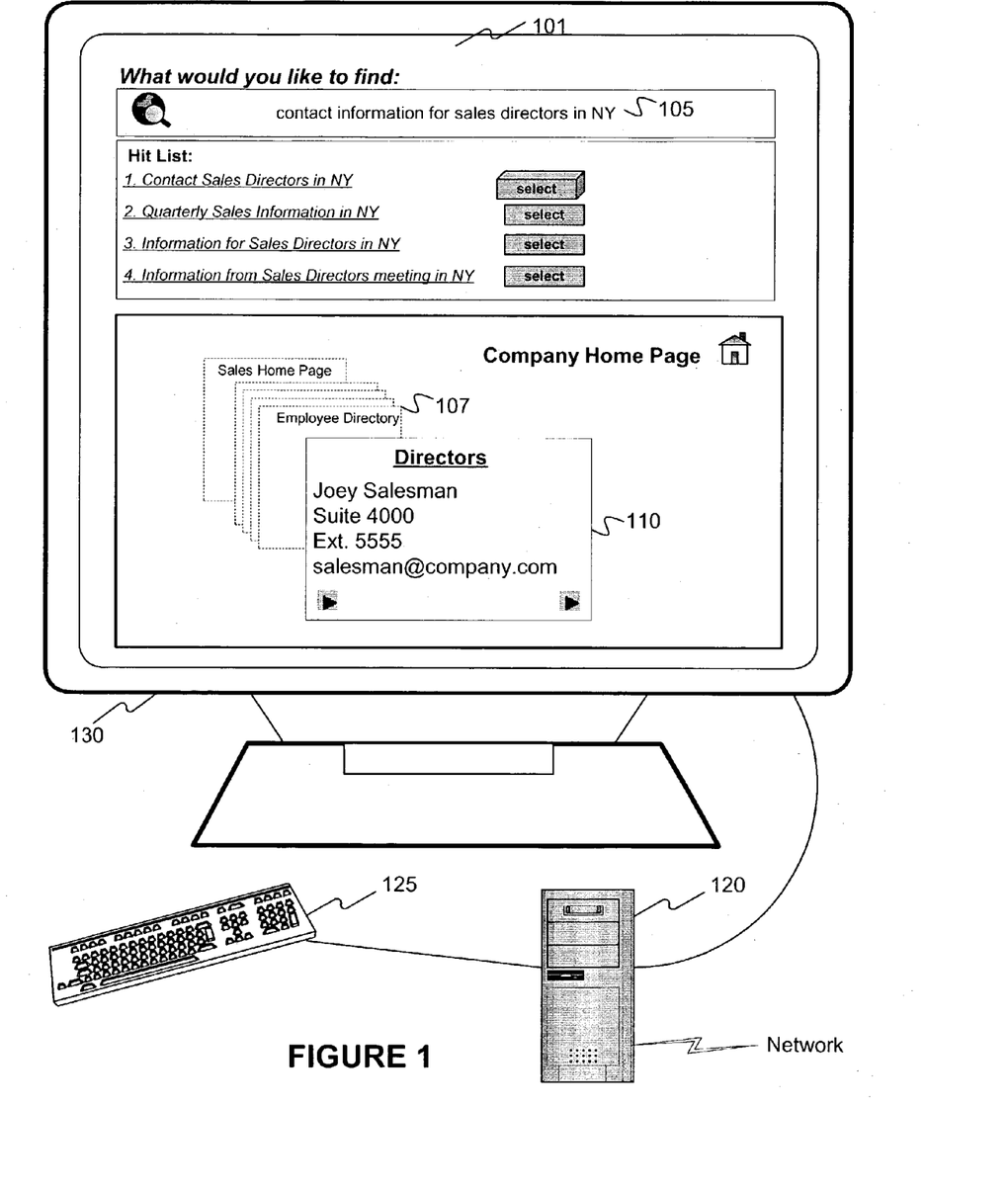
FIG. 1 depicts an exemplary screen shot consistent with the present invention.

Consistent with exemplary embodiments of the present invention, methods may be provided for associating descriptions with system entities, thereby enabling users to effectively and expeditiously navigate through an information system. One embodiment of the present invention is illustrated, by way of example, in the screen shot of FIG. 1. As illustrated in FIG. 1, a user of an information system, such as a computer application, may be prompted to input a description of a system entity. As depicted in the illustrated embodiment, the instant invention may prompt and enable the user to input the description via a graphical user interface (GUI) 101, which may be coupled to or included in the computer application. The user may search for a specific entity by entering a natural language description for that entity. For example, a user could enter description 105, which reads "contact information for sales directors in NY."

Assuming the description entered by the user is recognized, system entities having associations with that description may be presented to the user in, for example, the illustrated "hit list." The hit list may include entities which have associations with one or more of the description's constituents (e.g., each of the words). If the user selects one of the presented system entities (e.g., 1. Contact Sales Directors in NY), the selected entity (110) may be provided to the user. This may involve traversing through any number of intermediate web pages (107) and/or portions of the particular information system without the aid of the user and presenting the entity to the user. After the user selects the entity, associations between the description constituents and the selected entity may be strengthened.

If, however, the description is not recognized and/or the user does not choose a presented entity, the user may manually navigate to the desired entity and a new association may be created between the description and the chosen system entity. As a result, the system entity may be successfully retrieved when a user subsequently enters one or more of the words in the description. In this fashion, the instant invention learns as system use increases.

As explained above, associations may exist between each of the constituents in a description and a system entity. Thus, a given description need not be replicated verbatim (or even in its entirety) in a subsequent search in order for a user to be successfully routed to the desired system entity. For example, if a user subsequently enters "I want to contact the sales director," the instant invention may successfully link the user to the appropriate information.

The foregoing discussion is intended to introduce and provide initial clarity for some of the aspects associated with the present invention by referring to the exemplary embodiment depicted in FIG. 1. Further details of the illustrated embodiment as well as additional aspects and embodiments of the present invention will be described in the following discussion.

Figure 2:
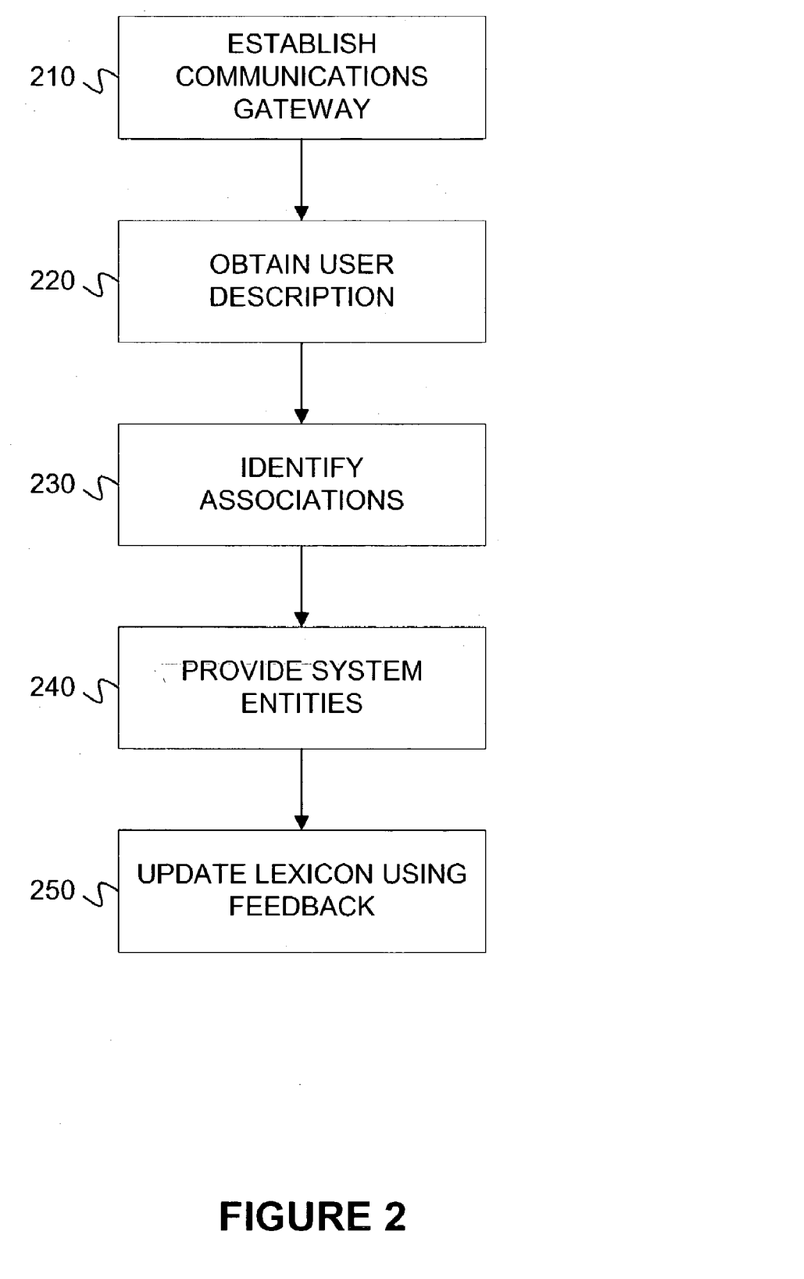
FIG. 2 is a flowchart consistent with methods of the present invention.

As indicated by step 210 in the flowchart of FIG. 2, a method consistent with the present invention may include establishing a communications gateway with an information system. As used herein, the term "information system" refers to any system, set of interconnected sub-systems, device, mechanism, infrastructure, or organization for acquiring, processing, storing, transmitting, disseminating, displaying, and/or disposing of information. In one particular implementation of the instant invention, the information system could be a computer application, the details of which will be discussed below in connection with FIG. 4.

In its broadest sense, establishing a communications gateway involves gaining access to, and enabling data exchange with, one or more information systems. In exemplary embodiments, establishing a communications gateway may involve providing an application interface, which is configured to establish a connection and facilitate data exchange with one or more computer applications. The application interface could be configured to interact with a user interface (e.g., a GUI) associated with the computer application(s) in order to obtain information from and provide information to users of the application. Additional details of an application interface consistent with the instant invention will be discussed later in connection with FIG. 4.

Consistent with principles of the present invention, methods may be provided for obtaining, via the communications gateway, a description of an information system entity from a user, as indicated in step 220 of FIG. 2. As used herein, the term "system entity" refers to any object, item, data, or information associated with an information system including, but not limited to, textual data, numerical data, files, directories, audio, video, menus items, hyperlinks, communication information, images, system actions, and even people associated with the system. A description of a system entity includes any information provided by a user of, or a participant in, an information system including, but not limited to, visual information, audio information, and alphanumeric information. For example, as illustrated in FIG. 1, a description could be a natural language textual expression such as description 105, which reads "contact information for sales directors in NY." In certain embodiments, the natural language descriptions could be contrary to conventional language format or syntax. For example, the expressions could be slang, jargon, or in a specific dialect or pidgin. Additionally or alternatively, descriptions may include symbolic descriptions. A description of a system entity may, in exemplary embodiments, comprise one or more "descriptive elements" or constituents, for example, each of the words in description 105.

Consistent with principles of the instant invention, obtaining a description may involve enabling a user of a particular information system to input descriptions via the communications gateway. For example, the above-mentioned application interface could retrieve, from the user of a computer application, a description of an entity associated with the application. The description could be inputted by, for example, an input device such as a mouse or keyboard 125. In addition, descriptions could be inputted audibly and/or visually by a user. Accordingly, the input device could include one or more audio and/or video capture devices, which may, for example, enable users to input descriptions via audible utterances. Additional details of the input device will be discussed below in connection with FIG. 5.

In exemplary embodiments, obtaining a description of an information system may involve prompting or cueing the user to input a description via an input device coupled to the information system. The user may be prompted or cued to input a description by way of a textual and/or graphical message or image displayed, for example, via a computer monitor 130. Prompting could also involve presenting audible cues to the user via an audio output device (e.g., a speaker). In one implementation, an application interface could cause a GUI associated with a computer application to prompt the user and accept inputted descriptions therefrom.

As indicated by step 230 of the flowchart of FIG. 2, a method consistent with the present invention may include identifying associations related to the user descriptions. As used herein, the term "association" refers to a qualitative or quantitative correlation between a system entity and one or more descriptive elements. For example, the descriptive elements "contact information" could have an association with, or may point to, a system entity such as a data file containing phone numbers, addresses, e-mails, etc. It should, however, be understood that a given system entity may have an association with any number of distinct descriptions. For instance, the above-mentioned data file may have an association with the descriptive elements "contact information" and an association with the descriptive elements "phone number." Correspondingly, a given descriptive element may have an association with a plurality of system entities. For example, the descriptive element "John" may have associations with several people with that name.

Consistent with principles of the instant invention, there may be methods for establishing a lexicon of associations between descriptions and system entities via explicit training and/or feedback. In one embodiment, associations may be explicitly taught or obtained via explicit training. Explicit training may involve using known examples or cases to associate a given descriptive element with a system entity. For example, explicit training may involve loading pre-configured associations into a computer memory prior to enabling the user to input descriptions. Associations may also be established via user feedback. For example, methods may be provided for dynamically establishing new associations and/or updating pre-configured or recently acquired associations using information obtained from a user. Additional details of explicit training and feedback-based training, in relation to one configuration of the instant invention, will be discussed below in connection with FIG. 7.

Figure 3:
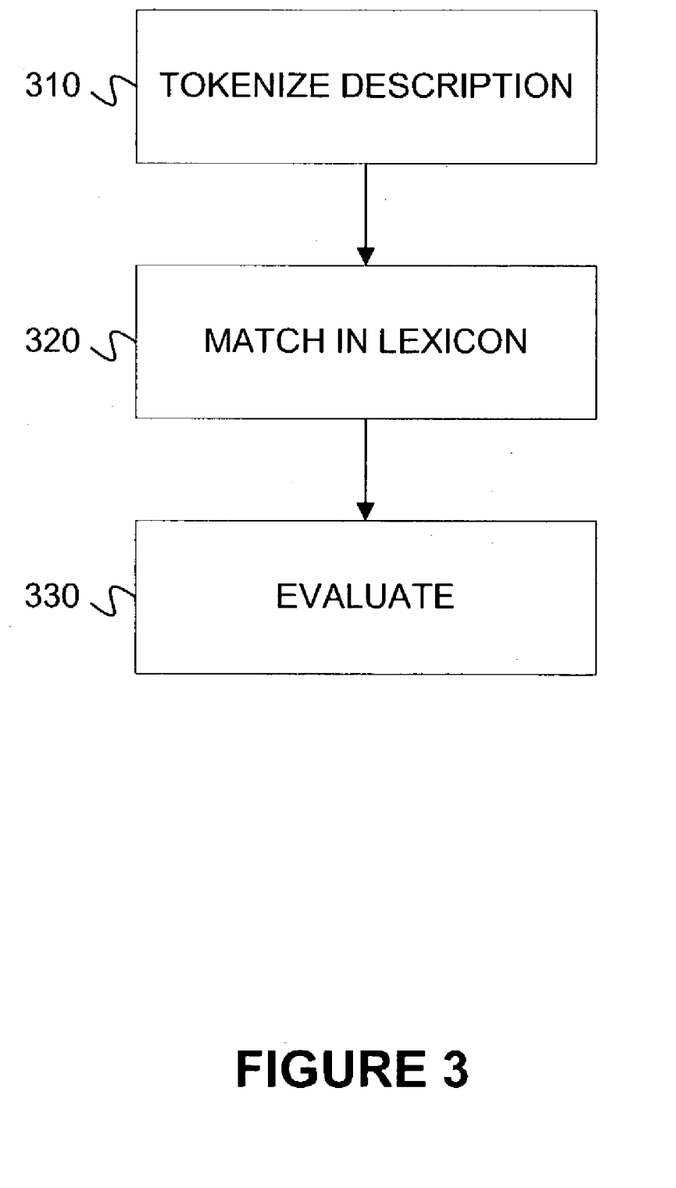
FIG. 3 is a flowchart graphically depicting steps of a method consistent with the present invention.

In one implementation of the instant invention, identifying information system entities having associations with the user-inputted descriptions may, in one implementation, involve the steps illustrated in the flowchart of FIG. 3. As indicated by step 310, a description received from a user may be tokenized. That is, each of the discrete descriptive elements included in the description may be extricated or separated. In addition, tokenizing may involve deleting, adding, and/or converting certain descriptive elements as necessary. For example, the descriptive elements "a" or "the" may be deleted from a description due to their ubiquity. After the description is tokenized, each of the descriptive elements may be searched for (or matched with elements) in the lexicon of associations (step 320). In one implementation, matching user inputted descriptive elements with descriptive elements in the lexicon may be accomplished via exact matching, fuzzy matching, and/or phonetically-based fuzzy matching.

After descriptive elements obtained from a user are found in the lexicon, the associations between system entities and the descriptive elements in the lexicon matching those inputted by the user may be evaluated, as indicated by step 330. In one embodiment, evaluating entities may involve prioritizing the system entities having associations with the user description.

In exemplary implementations of the instant invention, prioritizing entities could be accomplished via weights or biases. Consistent with principles of the present invention, each association between a descriptive element and a system entity may be assigned a qualitative and/or quantitative weight or bias indicating the strength/correlation of the association. In one embodiment, each association weight may be initialized (e.g., during explicit training) with equal nominal values and subsequently increased using feedback obtained from users. Additional details regarding feedback will be discussed below.

Prioritizing the associations (step 330) may involve computing a score for each matching entity and ranking the entities according to the scores. The scores may indicate a cumulative value including the weights for each association between a particular system entity and the descriptive elements in the user-inputted description. For example, the descriptive element "agenda" may have an association (weight=3) with a data file containing a television programming schedule (entity A) and an association (weight=4) with a different data file containing a corporate business meeting schedule (entity B). In addition, the descriptive element "TV" may have an association (weight=7) with the television programming schedule (entity A) and an association (weight=1) with the corporate meeting schedule (entity B). Accordingly, if the user inputs the description "TV agenda," assuming the descriptive elements "TV" and "agenda" are found in the lexicon, system entity A may be given a score of (3+7)=10 and system entity B may be given a score of (4+1)=5. Accordingly, since the data file containing the television programming information (entity A) is scored higher, it may be ranked or classified as having more relevance to the user's description.

As indicated by step 240 of the flowchart of FIG. 2, a method consistent with the present invention may include providing the user with entities associated with a given description. Providing users with system entities may include, but is not limited to, providing access to entities, routing the user to entities, and/or presenting entities to the users. For example, where the information system is an automated call-routing system, the descriptive element "John" could be associated with the call routing information associated with a person named John and, when a user inputs "John," the user may be routed to that person. In another example, as FIG. 1 illustrates, entities associated with the descriptive elements received from a user may be presented in a hit list via an output device such as monitor 130. In exemplary embodiments, system entities may be arranged according to their respective scores, as computed in the manner discussed above. Returning to the example mentioned in connection with step 330 of FIG. 3, entity A may be presented at the top of a hit list on a computer screen and/or may be visually or audibly accentuated to distinguish it from other matching entities, since its score is the highest.

Consistent with principles of the instant invention, the invention may be personalized for a given user, work group, and/or environment. That is, each system entity may be associated with a distinct descriptive element corresponding to each of a plurality of distinct users, work groups, and/or environments. As a result, a user could enter a particular description of a given system entity and, in response, be presented with that entity, while another user could enter a different description and be presented with the same system entity. It also follows that several distinct users could enter the same description and each, in response, be presented with a distinct system entity. In exemplary implementations, each user may have a unique user identification (ID) and/or password, which, when supplied, may cause a user profile, or corpus, containing associations and preferences related to that specific user to be referenced. Additional details of identifying a particular user will be discussed below in reference to FIG. 7A.

As mentioned above and indicated by step 240 in the flowchart of FIG. 2, there may be methods of the present invention for using feedback to update the lexicon of associations. Updating the lexicon of associations may involve acquiring new associations, modifying associations already present in the lexicon, and/or removing associations.

As explained above, associations may be initially established via explicit training. These initial associations may, however, be modified using feedback obtained from the user. In its broadest sense, feedback includes any information received from a user after providing the user with system entities. In one embodiment, feedback may be obtained by way of a user selecting a particular entity presented, for example, selecting item 1 from the hit list illustrated in FIG. 1. Consistent with such an embodiment, using feedback to modify associations may entail increasing the weights of each association between the descriptive elements in the description (e.g., 105) and the selected system entity (e.g., item 1). In this fashion, associations may evolve as user feedback is obtained.

In addition to modifying associations, new associations may be acquired using feedback obtained from users. For example, if one or more descriptive elements inputted by a user are not found in the lexicon of associations, a new association may be created and added to the lexicon. This may entail prompting and enabling the user to manually retrieve the desired system entity, for example, by navigating through a website to a particular file, and associating the descriptive element(s) with the item in response to the user selecting the item (e.g., opening the file). Methods of the present invention may be provided for enabling newly acquired associations to be available for subsequent use. In this fashion, the lexicon of associations may dynamically evolve over time and with use.

Using feedback obtained from a user to update the lexicon may enable a given user, workgroup, or environment to cause distinct and personalized descriptions to be associated with system entities. Moreover, since feedback facilitates dynamic learning, a given user may cause system entities to be associated with any type of descriptions, even descriptions contrary to conventional language. For example, as mentioned above, descriptions of system entities could be slang, jargon, or in a specific dialect or pidgin.

In at least one embodiment of the present invention, the lexicon of associations may be updated automatically based on the passage of time. For example, associations may be weakened or removed if a descriptive element is not used by anyone over a period of time.

Figure 4:
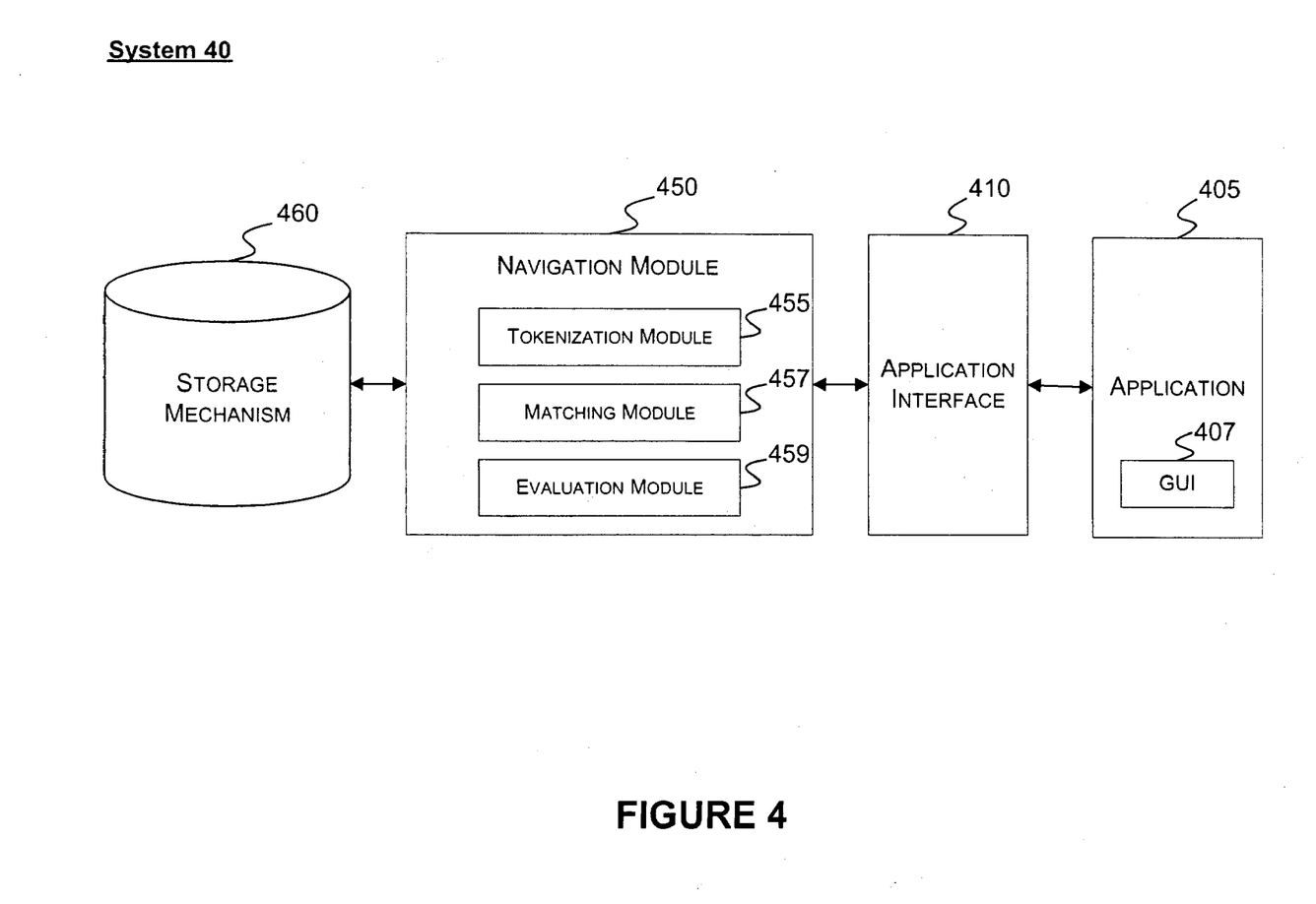
FIG. 4 is an exemplary block diagram of a system in which the present invention may be practiced.

In one implementation, methods consistent with the present invention may be practiced in system 40 of FIG. 4. As illustrated, system 40 may comprise an information system (e.g., an application 405), a communications gateway (e.g., an application interface 410), a navigation module 450, and a storage mechanism 460.

Application 405 may include any type of program designed to perform a specific function for one or more users or other devices. Application 405 may include, but is not limited to, one or more of a word processor, a database program, an internet, extranet, and/or intranet browser or website, a development tool, a scheduling tool, a routing tool, a communication tool, a menu interface, and an audio and/or video editing program. Application 405 may be a compilation of instructions for manipulating data written in any structural, procedural, object-oriented, or other type of programming language. As illustrated, application 405 may comprise a user interface such as a GUI for facilitating using interaction with the application.

Application 405 may be operatively coupled, via application interface 410, to navigation module 450. Navigation module 450 may be any device, mechanism, and/or compilation of instructions configured to receive information from and provide information to application 405. Application interface 410 may, therefore, be any device, mechanism, or compilation of instructions configured to enable navigation module 450 to interact with application 405. Navigation module 450 may also include or be coupled to storage mechanism 460. Storage mechanism 460 could be any mechanism for accessing, managing, and updating an aggregation of data including, but not limited to, one or more of a relational database, a distributed database, and an object-oriented programming database. In exemplary implementations, storage mechanism 460 may serve as a central repository for information used by navigation module 450. For example, storage mechanism 460 could maintain the lexicon of associations and any other data used by navigation module 450 when interacting with one or more application(s).

In operation, navigation module 450 may receive descriptions from users and, in response, provide users with associated system entities. In one particular implementation, navigation module 450 may comprise tokenization module 455, matching module 457, and evaluation module 459.

Tokenization module 455 may be any mechanism, process, or algorithm configured to tokenize descriptions received from a user. As explained above in connection with step 310 of FIG. 3, descriptions inputted by users may be separated into discrete constituents or descriptive elements.

In exemplary configurations, tokenization module 455 could receive an ASCII string and output a list of words.

Matching module 457 may be any mechanism, process, or algorithm for matching descriptive elements with descriptive elements residing in the lexicon (e.g., storage mechanism 460). Matching module 457 may include one or more exact matching, fuzzy matching, and/or phonetically-based fuzzy matching algorithms. Matching module 457 may identify system entities which have one or more associations with the descriptive elements inputted by a user.

Evaluation module 459 may be any mechanism, process, or algorithm configured to prioritize the entities identified by matching module 457. In one implementation, evaluation module 459 may compute scores for system entities and sort the entities, in the manner discussed above in connection with step 330 of FIG. 3.

For clarity of explanation, application 405, application interface 410, navigation module 450, and storage mechanism 460 are described here as discrete functional elements. Further, for purposes of explanation, tokenization module 455, matching module 457, and evaluation module 459 are described as discrete functional elements within navigation module 450. However, it should be understood that the functionality of these elements and modules may overlap and/or may exist in fewer elements and modules. Moreover, all or part of the functionality of these elements may co-exist or be distributed among several geographically dispersed locations.

Figure 5:
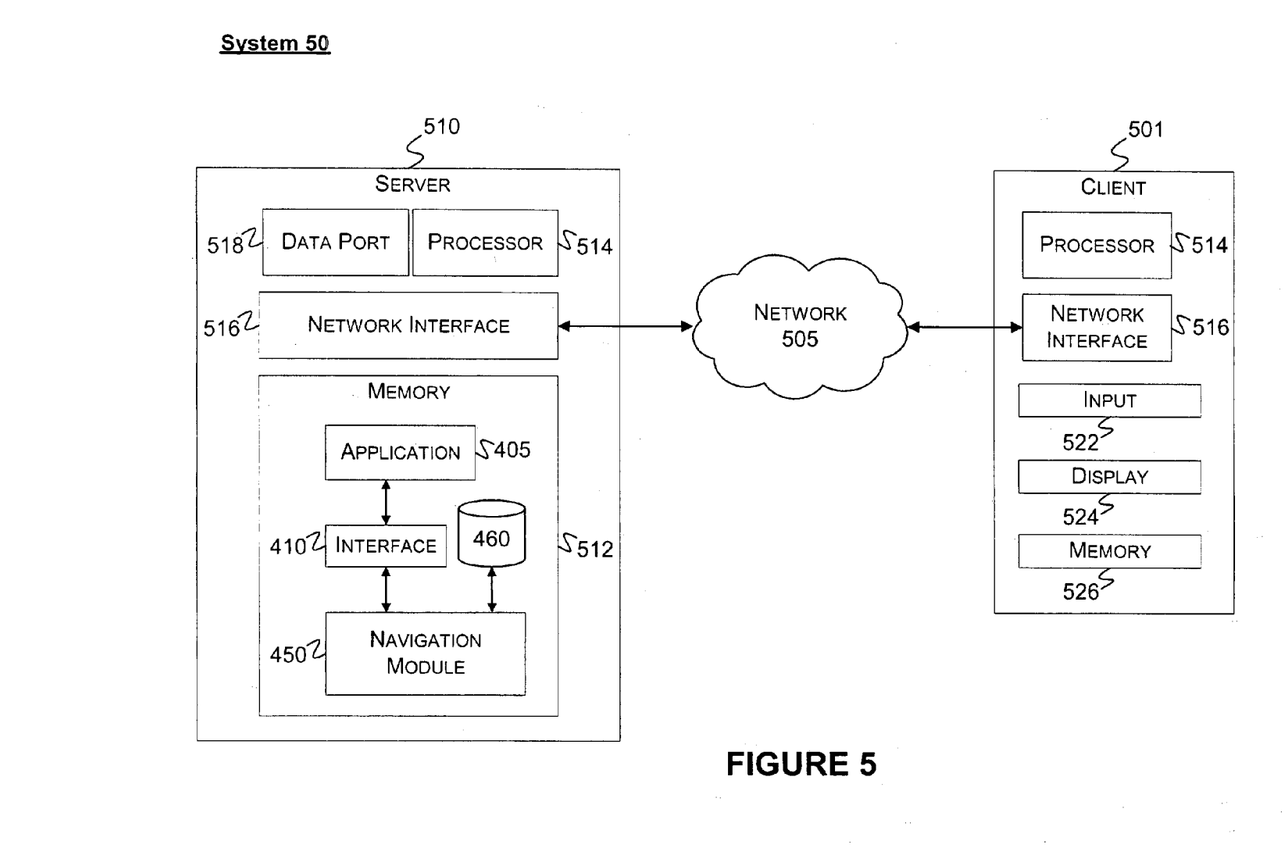
FIG. 5 is an exemplary block diagram of another system in which the present invention may be practiced.

In one particular configuration of the instant invention, system 40 may be implemented in system 50, which is depicted in FIG. 5. As illustrated in FIG. 5, system 50 may include a client 501 and a server 510, which may be interconnected via, or included in, a network 505. For the sake of brevity, a single server and client are depicted. However, it should be understood that any number of geographically dispersed clients and/or servers may be coupled to network 505.

Network 505 may be the Internet, a virtual private network, a local area network, a wide area network, a broadband digital network or any other structure for enabling communication between two or more nodes or locations. Network 505 may include one or more wired and/or wireless connections. Network 505 may employ communication protocols such as Transmission Control and Internet Protocol (TCP/IP), Asynchronous Transfer Mode (ATM), Ethernet, or any other compilation of procedures for controlling communications among network locations. Server 510 and client 501 may be operatively connected to network 505 by communication devices and software known in the art, such as those commonly employed by Internet Service Providers (ISPs) or as part of an Internet gateway. Server 510 and client 501 may also be assigned network identifiers (ID). As used herein, the term "ID" refers to any symbol, value, tag, or identifier used for addressing, identifying, relating, or referencing a particular element. Network IDs, for example, may include IP addresses.

Server 510 may be connected to network 505 via network interface 516 which may be operatively connected via a wired and/or wireless communications link. Network interface 516 may be any mechanism for sending information to and receiving information from network 505, such as a network card and an Ethernet port, or to any other network such as an attached Ethernet LAN, serial line, etc. In one configuration, network interface 516 may allow server 510 to interact with several clients as well as the Internet.

As illustrated in FIG. 5, server 510 may also comprise a memory device 512, a processor 514, and a data port 518. It should be understood that server 510 may comprise additional components and one or more of the components residing in server 510 may be scalable in order to accommodate additional services, data, and/or clients.

Memory device 512 may be any mechanism capable of storing information including, but not limited to, RAM, ROM, magnetic and optical storage, organic storage, audio disks, and video disks. Although a single memory device is shown, any number of memory devices may be included in server 510, and each may be configured for performing distinct functions. Memory device 512 may contain one or more of the components included in system 40. For example, in one implementation, application 405, application interface 410, navigation module 450, and storage mechanism 460 (e.g., a database) may be contained in memory 512 of server 510.

In one configuration, server 510 may also include processor 514, which may be operatively configured to execute instructions. Processor 514 may be configured for routing information among components and devices and for executing instructions from one or more of application 405, application interface 410, and navigation module 450. As illustrated, server 510 may additionally comprise a data port 518 for transmitting data serially or in parallel.

In one configuration, client 501 may include components similar to those included in server 510, such as processor 514 and network interface 516. However, client 501 may be structurally different from server 510 and may have varying or additional components. Client 501 may be a personal computer, mobile computing device (e.g., a PDA), mobile communications device (e.g., a cell phone), or any other structure that enables a user to remotely access information from server 510 and/or network 505. In alternative embodiments, client 501 could be a kiosk or "dumb" terminal coupled to server 510. In one exemplary implementation, client 501 may comprise an input device 522, an output device 524, and a memory 526.

Memory 526 may be of similar structure to memory device 512 in server 510. However, in certain configurations, memory 526 may have less storage capacity than memory device 512 in order to reduce cost and size.

Input device 522 may include at least one button actuated by the user to input commands and thereby select from a plurality of processor operating modes. Input device 522 may include components such as keyboard 125, a mouse, and/or a touch screen. Additionally, as mentioned above, input device 522 could include one or more audio and/or video capture devices. For example, input device 522 may include a microphone to which a user can input audible utterances. Accordingly, input device 522 may include or be coupled to voice recognition software for recognizing and parsing inputted utterances. The voice recognition software could reside in memory 526 or, alternatively, be included in or coupled to application interface 410. Input device 522 may additionally or alternatively include a data reading device and/or an input port.

Output device 524 may be configured to visually display text, images, or any other type of information by way of a cathode ray tube, liquid crystal, light-emitting diode, gas plasma, or other type of display mechanism. For example, output device 524 may be a computer monitor such as monitor 130. Output device 524 may additionally or alternatively be configured to audibly present information. For example, output device 524 could include an audio output device, such as a speaker, for outputting audible sounds to a user. Accordingly, output device 524 may include or be coupled to audio software configured to generate synthesized or pre-recorded human utterances. Such software could reside in memory 526 and be configured to interact with application interface 410. The audio software could, alternatively, be included in or coupled to application interface 410 itself. Output device 524 may be used in conjunction with input device 522 for allowing user interaction.

Although FIG. 5 depicts system 40 residing entirely in server 510, it should be understood that one or more of the components of system 40 may exist in or be distributed among one or more clients (501), or other locations, coupled to network 505. For example, application 405 could reside in client 501 and storage device 460 may reside external to server 510 and may be coupled to the server and/or client via network 505.

It should also be understood that, as mentioned above, any number of clients may be included in system 50. In one configuration, each of a plurality of clients (501) may access application 405, residing on server 510, and interact with system 40, also residing on sever 510. In some configurations, a plurality of applications could be used with system 40. Thus, each of the plurality of clients (501) could include an application 405 configured to interact (through application interface 410) with navigation module 450 residing on a single server 510. Consistent with principles of the instant invention, navigation module 450 and application interface 410 may be configured to interact with a plurality of applications and/or clients either simultaneously or disjointedly.

In alternative implementations of the instant invention, each of the plurality of clients (501) may contain a replica or version of all or part of system 40 respectively. In such implementations, each version may operate exclusively from or collaboratively with each other. Thus, each of a plurality of clients (501) could access application 405 from a single server 510 while each client maintains a version of navigation module 450 and application interface 410. In certain embodiments of the instant invention, system 40 may reside entirely within a client, thereby rendering the inclusion of server 510 in system 50 unnecessary.

Figure 6:
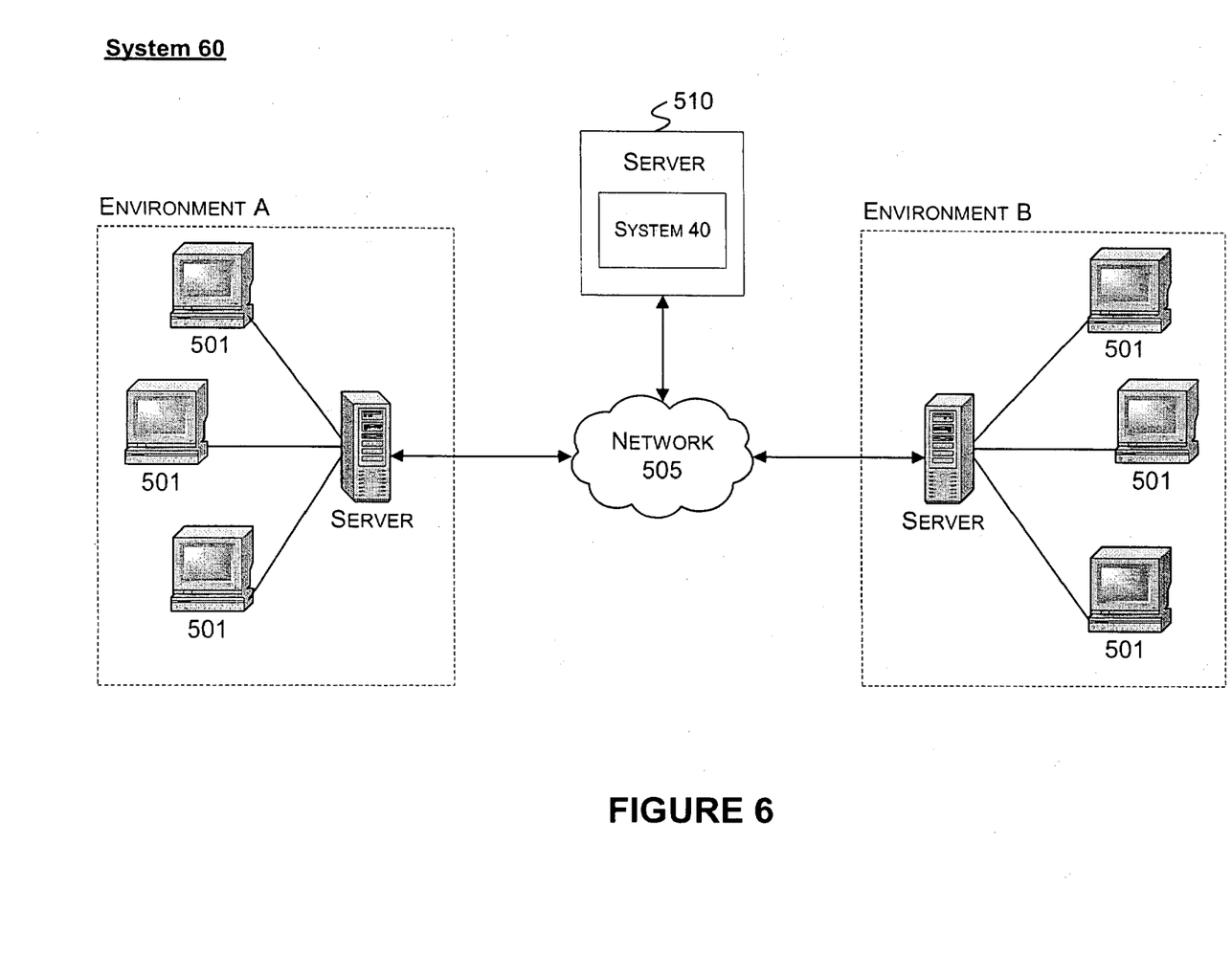
FIG. 6 is an exemplary block diagram of another system in which the present invention may be practiced.

System 60 of FIG. 6 depicts another implementation of the instant invention. As illustrated, system 40 may exist in server 510, which is coupled to network 505. In addition, one or more environments (e.g., A and B) may be coupled to network 505 and configured to interact with system 40. An environment could include, as shown, a client-server or other type of network residing in a particular geographic location. For example, environments A and B could represent two distinct workgroups. Consistent with principles of the instant invention, system 40 may be configured to distinguish between environments and could be personalized for each environment.

Figure 7:
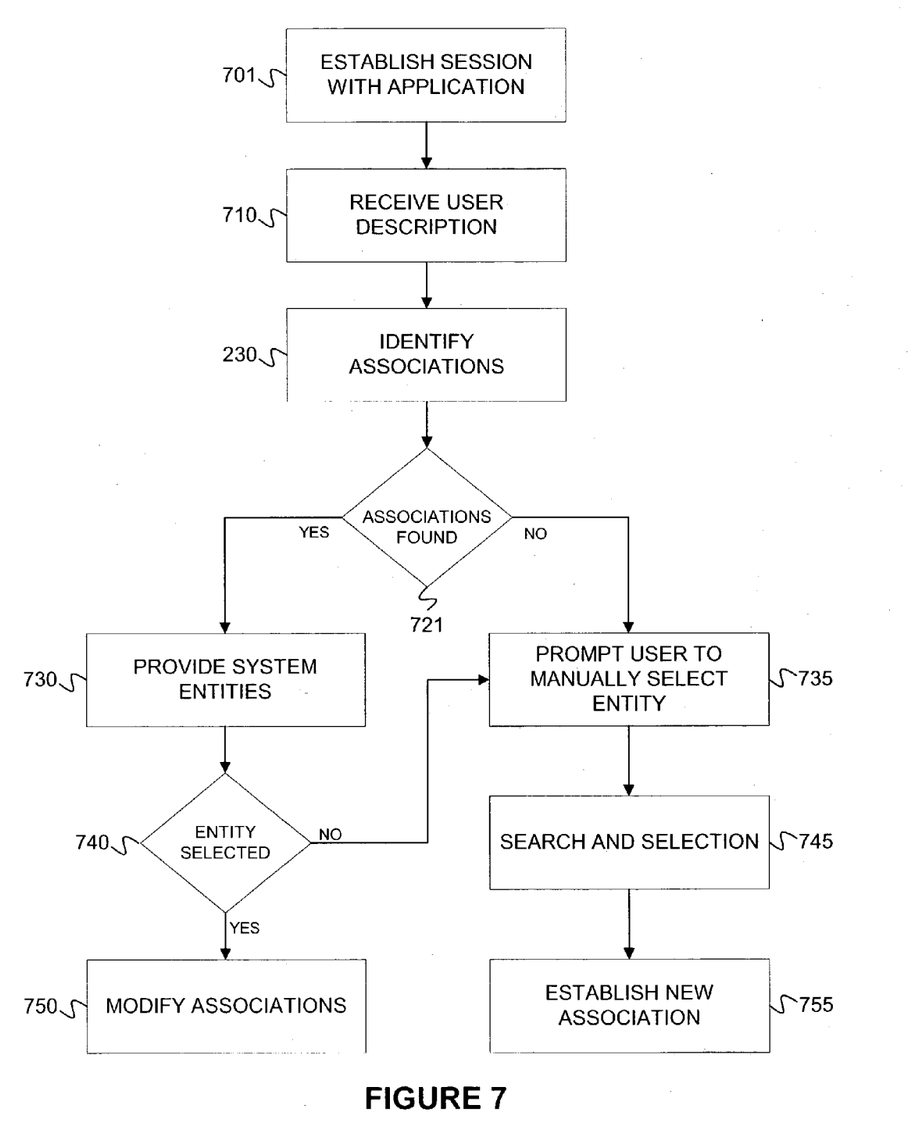
FIG. 7 is a flowchart graphically depicting operation of an exemplary implementation of the present invention.

In one implementation, operation of the instant invention may be consistent with the steps depicted in the flowchart of FIG. 7. It should however be understood that other method steps may be used, and even with the method depicted in FIG. 7, the particular order of events may vary without departing from the scope of the present invention. Further, certain steps may not be present, additional steps may be added, and the order of such steps may be modified without departing from the scope and spirit of the invention, as claimed.

As indicated by step 701, a session may be established between navigation module 450 and one or more applications (405). Establishing a session may involve identifying a particular application, identifying a particular user, loading data and configuring parameters. In one configuration, establishing a session may involve the steps depicted in the flowchart of FIG. 7A. As indicated by step 702, application 405 may be identified. Consistent with principles of the instant invention, a unique identifier (application ID) may be associated with a particular application (405) in order to distinguish it from another application (405). Step 702 may involve a client 501 transmitting a request to server 510 to gain access to one of a plurality of applications (405) contained in server 510. The request could contain an application ID or cause an ID to be accessed (e.g., from memory 512) which enables application interface 410 to identify which application with which to interact. Step 702 could also include an application, residing on client 501, transmitting an application ID to application interface 410.

Figure 7A:
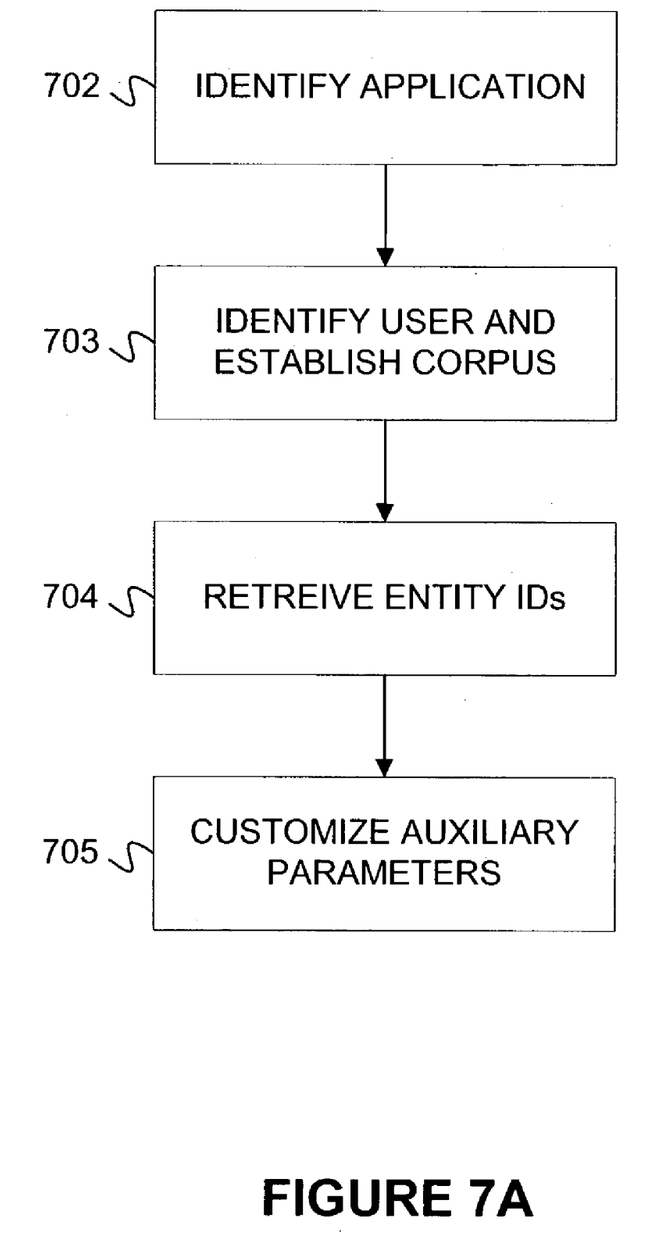
FIG. 7a is a flowchart depicting one aspect of the operation of the present invention.

Upon identifying the appropriate application, a corpus for that application may be accessed, as indicated by step 703. As used herein, the term "corpus" refers to a compilation of data associated with a particular application. Application interface 410 may access a corpus for a particular application identified by the application ID from storage device 460. Consistent with principles of the instant invention, a corpus may be defined for each user or environment. A corpus may include language preference data, specific description-entity associations, and other user specific information. Accordingly, step 703 may involve identifying a particular user or environment and retrieving (from storage mechanism 460) a corresponding corpus. In one example, clients (501) may have unique IDs which could be transmitted to application interface 410 and used to identify a particular user or environment. Further, as previously mentioned, users could have unique user IDs and/or passwords. Accordingly, step 703 could involve retrieving a user ID, authenticating the user, and accessing a corpus associated with the user. In one particular implementation, user authentication may be performed via a public key infrastructure (PKI) employing public key cryptography. In exemplary embodiments, application interface 410 may be configured to receive the user IDs and/or passwords from application 405 and perform user authentication. However, in alternative embodiments, application 405 could perform user identification and authentication and may then transmit a message to application interface 410 including information corresponding to the identified user.

After identifying an application and user, and retrieving one or more corresponding corpora, identifiers (IDs), such as pointers, associated with each of the system entities of application 405 may be retrieved (step 704) from application 405 by application interface 410. The identifiers may be used to allow navigation module 450 to identify and access the system entities associated with a particular application.

At this point, auxiliary parameters may be customized, as indicated by step 705. Auxiliary parameters may include, but are not limited to, information associated with linguistics. Auxiliary linguistic parameters may be, for example, rules, morphological markers, or thresholds related to language that may be used to determine the function of tokenization module 455 and matching module 457. Auxiliary linguistic parameters also assist in identifying and matching entities in descriptions. One example of auxiliary parameters are morphological markers that may, for example, be used in determining words with the same root or stem. For example, if morphological markers, such as the endings "s," "ed," and "ing," are stored in a table and compared to a list of words, such as "links," "linked," and "linking," it may be determined that all three words have the same root or stem, "link." Auxiliary parameters may also be thresholds. In one embodiment consistent with the present invention, thresholds are used to determine words that occur too frequently to be a distinguishing characteristic. Another example of an auxiliary parameter is a rule whereby if a token contains a certain character or string x, the token is then modified by substituting y for x, where y is another character or string.

Step 705 could also include accessing information from a reference corpus. In exemplary embodiments of the instant invention, one or more reference corpora may be established (and stored in storage mechanism 460) from which other corpora, such as personal corpora corresponding to a user, inherit data. The reference corpus may include a master list of pre-configured associations. The reference corpora may serve as a vehicle for distributing information (e.g., associations) to a plurality of personalized navigation modules. For example, user personal corpora may begin as a copy of a reference corpus that then is modified to include user specific information. In another embodiment consistent with the present invention, navigation modules may utilize both reference corpora that are globally updated and personal user corpora that comprise user specific information.

As explained above, the lexicon of associations may initially be established by explicit training. Accordingly, step 701 could involve initializing the lexicon by loading pre-configured associations into storage mechanism 460, for example, via the reference corpora.

Referring back to FIG. 7, a user description may be received, as indicated by step 710. In one implementation, a user of application 405 could be prompted to input a description via application interface 410 and may input the description via input device 522. The description may be transmitted from application 405 to application interface 410 and routed, by application interface 410, to navigation module 450.

After receiving a description, navigation module 450 may identify associations corresponding to the description, as indicated by step 230. In one configuration, navigation module 450 may identify associations from the lexicon in storage mechanism 460, performing the steps illustrated in FIG. 3.

Assuming one or more associations are identified (decision 721=yes), the corresponding system entities may be provided to the user, as indicated by step 730. In one implementation, application interface 410 may route entity IDs to application 405 and the entities may be presented via output device 524. Presenting the entities could involve, as illustrated in FIG. 1, displaying a hit list of links via a computer monitor. Additionally or alternatively, presenting the entities could include causing audible sounds to be provided via a speaker. For example, a synthesized or pre-recorded human voice may describe the entities for the user via the speaker.

If the user selects one or more of the entities presented (decision 740=yes), associations between each of the descriptive elements included in the inputted description and the selected entity may be modified via navigation module 450 (step 750). Step 750 could, for example, include incrementing bias weights associated with the descriptive elements and the selected entity and, perhaps, even decrementing bias elements associated with the descriptive elements and the entities presented but not selected by the user.

If, however, no associations are found (decision 721=No), that is, all or substantially all of the elements in the description cannot be found in the lexicon or the elements are found, but no associations exist in the lexicon, the user may be prompted to manually select a system entity in application 405 (step 735). The user may also be prompted to manually select an entity if the user, for whatever reason, does not select one of the entities presented at step 730 (i.e., decision 740=No). After the user is prompted, the user could then manually search and/or select a desired application entity (step 745). Once such a selection is made, navigation module 450 may create a new association between each of the descriptive elements included in the description received at step 710 and the selected entity, as indicated by step 755. The new associations may be added to the lexicon in storage mechanism 460 for future use. As a result, if a user subsequently inputs a description containing one or more of the descriptive elements included in the new associations, the user will be provided with application entities.

It should be understood that processes described herein are not inherently related to any particular apparatus and may be implemented by any suitable combination of components. Further, various types of general purpose devices may be used in accordance with the teachings described herein. It may also prove advantageous to construct specialized apparatus to perform the method steps described herein.

It will be apparent to those skilled in the art that various modifications and variations can be made in the systems and methods of the present invention as well as in the construction of this invention without departing from the scope of or spirit of the invention.

The present invention has been described in relation to a particular example which is intended in all respects to be illustrative rather than restrictive. Those skilled in the art will appreciate that many different combinations of hardware, software, and firmware will be suitable for practicing the present invention.

Moreover, other implementations of the invention will be apparent to those skilled in the art from consideration of the specification and practice of the invention disclosed herein. It is intended that the specification and examples be considered as exemplary only. To this end, it is to be understood that inventive aspects lie in less than all features of a single foregoing disclosed implementation or configuration. Thus, the true scope and spirit of the invention is indicated by the following claims.

What is claimed is:

1. A method for associating descriptions with information system entities, the method comprising the steps of:
   establishing a communications gateway with an information system;
   obtaining, via the communications gateway, at least one descriptive element from a user of the information system;
   using the at least one descriptive element to identify, via a lexicon of associations, at least one first entity related to the information system having an association with said descriptive element;
   providing, to the user, the at least one first entity without the user further interacting with the information system;
   enabling the user to disregard the at least one first entity provided to the user and manually retrieve at least one second entity associated with the information system, the second entity not previously provided to the user; and
   adding to the lexicon a new association between the descriptive element inputted by the user and the at least one second entity manually retrieved by the user.

2. The method of claim 1, wherein establishing a communications gateway comprises establishing an interface with a computer application.

3. The method of claim 1, wherein obtaining the at least one descriptive element from a user comprises enabling the user to input at least one of an alphanumeric character, an audio signal, and a visual signal.

4. The method of claim 1, further comprising modifying the lexicon by weakening the association between at least one entity and its associated descriptive element based on time since first use of the associated descriptive element.

5. The method of claim 1, wherein the providing step comprises at least one of providing access to the information system, presenting the information system, and routing the user to the system.

6. The method of claim 1, further comprising updating the lexicon based on feedback obtained from the user relating to the at least one first entity.

7. The method of claim 6, wherein updating the lexicon based on feedback comprises reinforcing the association between the first entity and the descriptive element in response to the user selecting the first entity.

8. A method for associating descriptions with information system entities, the method comprising the steps of:
   establishing a communications gateway with an information system;
   obtaining, via the communications gateway, at least one descriptive element from a user of the information system;
   using the at least one descriptive element to identify, via a lexicon of associations, at least one first entity related to the information system having an association with said descriptive element;
   providing, to the user, the at least one first entity without the user further interacting with the information system;
   enabling the user to disregard the at least one first entity provided to the user and manually retrieve at least one second entity associated with the information system, the second entity not previously provided to the user; and
   updating the lexicon by weakening the association between at least one entity and the descriptive element in response to lack of use by the user.

9. A method for associating descriptions with information system entities, the method comprising the steps of:
   establishing a communications gateway with an information system;
   obtaining, via the communications gateway, at least one descriptive element from a user of the information system;
   using the at least one descriptive element to identify, via a lexicon of associations, at least one first entity related to the information system having an association with said descriptive element;
   providing, to the user, the at least one first entity without the user further interacting with the information system;
   enabling the user to disregard the at least one first entity provided to the user and manually retrieve at least one second entity associated with the information system, the second entity not previously provided to the user; and
   modifying the lexicon by weakening the association between at least one entity and its associated descriptive element based on time since first use of the associated descriptive element.

10. A system comprising:
    an information system;
    a storage mechanism;
    an interface coupled to the information system; and
    navigation means, coupled to the interface and the storage mechanism for:
    receiving, via the interface, a description provided by a user of the information system, the description including at least one descriptive element;
    extricating the at least one descriptive element from the description;
    retrieving from the storage mechanism at least one first entity related to the information system and having an association with the at least one descriptive element;
    prioritizing the at least one first entity by computing a score that reflects a correlation between the description and the at least one first entity, wherein the score includes a bias weight corresponding to the association between the at least one descriptive element included in the description and the information system;
    enabling the user to disregard the at least one first entity provided to the user and manually retrieve at least one second entity associated with the information system, the second entity not previously provided to the user; and
    causing the at least one first entity having an association with the at least one descriptive element to be presented to the user and, in response to the user selecting said at least one first entity, incrementing the bias weight corresponding to the association between the descriptive element and the information system.

11. The system of claim 10, wherein the description is a plurality of words and each of said plurality of words is a descriptive element.

12. The system of claim 11, wherein the navigation means extricates the at least one descriptive element by way of separating each of the plurality of words.

13. The system of claim 11, wherein the navigation means extricates by discarding at least one of the words in the description.

14. The system of claim 11, wherein the score is sum of bias weights corresponding to associations between each of the words included in the description and the information system.

15. The system of claim 10, wherein the description includes at least one of textual data, video data, and audio data.

16. The system of claim 10, wherein the information system is at least one computer application.

17. The system of claim 16, wherein the at least one entity related to the information system includes at least one of a file, a directory, a link, a menu item, an image, audio data, and a system action.

18. The system of claim 16, wherein the interface is an application interface.

19. The system of claim 10, wherein the storage mechanism includes a database.

20. The system of claim 10, wherein the information system resides in a first location and the navigation means resides in a second location.

21. The system of claim 20, wherein the second location is remotely located with respect to the first location.

22. The system of claim 20, wherein the first location and the second location are both located in a single computer.

23. The system of claim 20, wherein the first location is a client and the second location is server.

24. The system of claim 10, wherein the user of the information system accesses the information system via a computer coupled to a network.

* * * * *